(12) United States Patent
Rawat et al.

(10) Patent No.: US 7,822,793 B2
(45) Date of Patent: Oct. 26, 2010

(54) USER DATA PROFILE NAMESPACE

(75) Inventors: Anshul Rawat, Kirkland, WA (US);
Brian D. Wentz, Seattle, WA (US);
Chris J. Guzak, Kirkland, WA (US);
David G. De Vorchik, Seattle, WA (US);
Sierra M. Giampiero, Seattle, WA (US);
Jason F. Moore, Redmond, WA (US);
John E. Brezak, Woodinville, WA (US);
Ming Zhu, Sammamish, WA (US);
Mohammed A. Samji, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/097,670

(22) Filed: Apr. 1, 2005

(65) Prior Publication Data
US 2006/0224602 A1 Oct. 5, 2006

(51) Int. Cl.
*G06F 12/00* (2006.01)
(52) U.S. Cl. .................. 707/828; 707/694; 707/821; 707/829
(58) Field of Classification Search ............... 707/3, 707/200, 100, 694, 821–828, 829; 345/119, 345/789; 713/100
See application file for complete search history.

(56) References Cited

U.S. PATENT DOCUMENTS

| | | | | |
|---|---|---|---|---|
| 4,670,905 A * | 6/1987 | Sandvos et al. | ............. | 455/524 |
| 5,701,137 A * | 12/1997 | Kiernan et al. | ............. | 715/853 |
| 5,711,381 A * | 1/1998 | Archambeault et al. | ........ | 175/45 |
| 5,771,381 A * | 6/1998 | Jones et al. | ................. | 713/100 |
| 5,794,006 A * | 8/1998 | Sanderman | ................. | 709/223 |
| 5,842,218 A * | 11/1998 | Robinson | .................... | 707/102 |
| 5,933,599 A * | 8/1999 | Nolan | ......................... | 715/734 |
| 6,061,695 A * | 5/2000 | Slivka et al. | ................ | 715/203 |
| 6,181,925 B1 * | 1/2001 | Kaminsky et al. | ........... | 455/410 |
| 6,199,082 B1 * | 3/2001 | Ferrel et al. | ................. | 715/205 |
| 6,212,512 B1 * | 4/2001 | Barney et al. | .................. | 707/1 |
| 6,327,705 B1 * | 12/2001 | Larsson et al. | ............. | 717/174 |
| 6,370,549 B1 | 4/2002 | Saxton | | |
| 6,389,412 B1 * | 5/2002 | Light | ............................. | 707/3 |
| 6,393,429 B1 * | 5/2002 | Yagi et al. | .................... | 707/102 |
| 6,408,298 B1 | 6/2002 | Van et al. | | |
| 6,446,253 B1 * | 9/2002 | Mellmer | ..................... | 717/100 |
| 6,448,985 B1 * | 9/2002 | McNally | ..................... | 715/784 |
| 6,473,800 B1 * | 10/2002 | Jerger et al. | ................. | 709/226 |
| 6,525,748 B1 * | 2/2003 | Belfiore et al. | ............. | 715/855 |
| 6,606,649 B1 * | 8/2003 | Schwitters et al. | .......... | 709/206 |
| 6,678,724 B2 * | 1/2004 | Nakajima et al. | ........... | 709/219 |

(Continued)

OTHER PUBLICATIONS

Nguyen et al., NT/Windows 2000 User Profile Issues, Oct. 2001, ACM Press, pp. 120-122.*

(Continued)

*Primary Examiner*—Etienne P LeRoux
*Assistant Examiner*—Jessica N Le
(74) *Attorney, Agent, or Firm*—Shook, Hardy & Bacon L.L.P.

(57) ABSTRACT

A method and data structure for separating application data from user data in a namespace. The data structure provides an intuitive profile layout for developers or users while supporting legacy applications. The namespace utilizes a hierarchical structure allowing access by developers or users over a network to information contained in identified public folders and/or a user's profile.

11 Claims, 6 Drawing Sheets

U.S. PATENT DOCUMENTS

| | | | | |
|---|---|---|---|---|
| 6,725,239 | B2* | 4/2004 | Sherman et al. | 707/201 |
| 6,910,116 | B2* | 6/2005 | Lange et al. | 711/170 |
| 7,035,842 | B2* | 4/2006 | Kauffman et al. | 1/1 |
| 7,080,328 | B1* | 7/2006 | Sawyer | 715/853 |
| 7,451,163 | B2* | 11/2008 | Selman et al. | 1/1 |
| 2002/0040438 | A1* | 4/2002 | Fisher, Jr. | 713/200 |
| 2002/0049049 | A1* | 4/2002 | Sandahl et al. | 455/414 |
| 2002/0072922 | A1* | 6/2002 | Suzuki et al. | 705/1 |
| 2002/0138499 | A1* | 9/2002 | Anderson et al. | 707/104.1 |
| 2002/0143795 | A1* | 10/2002 | Fletcher et al. | 707/200 |
| 2003/0069901 | A1* | 4/2003 | Schein | 707/201 |
| 2004/0025035 | A1* | 2/2004 | Jean-Claude et al. | 713/189 |
| 2004/0064514 | A1* | 4/2004 | Daniell et al. | 709/206 |
| 2004/0070609 | A1* | 4/2004 | Estrada | 345/751 |
| 2004/0165008 | A1* | 8/2004 | Levine et al. | 345/789 |
| 2004/0205622 | A1* | 10/2004 | Jones et al. | 715/523 |
| 2004/0220899 | A1* | 11/2004 | Barney et al. | 707/1 |
| 2005/0055380 | A1* | 3/2005 | Thompson et al. | 707/200 |
| 2005/0198077 | A1* | 9/2005 | Van Der Heijden | 707/200 |
| 2006/0059536 | A1* | 3/2006 | Koba et al. | 725/142 |
| 2006/0173805 | A1* | 8/2006 | Clifford et al. | 707/1 |
| 2006/0206511 | A1* | 9/2006 | Picon et al. | 707/102 |

OTHER PUBLICATIONS

Good et al., Usability and Privacy: A Study of KaZaA P2P File-Sharing, Apr. 2003, ACM Press, vol. 5, Issue 1, pp. 137-144.*

European Search Report dated Nov. 28, 2008.

Thomas Handschuch: "Solaris 2 Systemadministration, Grundlagen und Systemmanagement"; IVT Verlag GMBH, 1995, pp. 213-216, XP002503852; ISBN: 3-8266-2605-2.

* cited by examiner

USER DATA PROFILE NAMESPACE

FIELD OF THE INVENTION

Aspects of the present invention relate generally to management of user profiles stored on computing devices. More specifically, aspects of the present invention provide a data structure defining an intuitive and useful namespace profile for separating application data from user data stored on computing devices.

BACKGROUND OF THE INVENTION

A Shell namespace organizes a file system and other objects managed by the Shell into a tree-structured hierarchy. A namespace may include two basic types of objects: folders and files. Folders may be considered nodes of a tree-structure hierarchy, whereas, files the leaves of the tree-structured hierarchy. Today, when a user logs onto a computing device, a user profile is created wherein the user may store user specific information and configuration information for future use and keep it separated form other users logging onto the machine. The configuration information may include particular tool bar settings, screen resolution settings, and/or favorites.

In existing operation systems, such as Windows® brand XP Operating System, user profiles contain various known folders such as the My Documents folder or My Pictures folder. These known folders may provide access across multiple applications and computer network environments in order for developers and users to access information.

Figure 2:
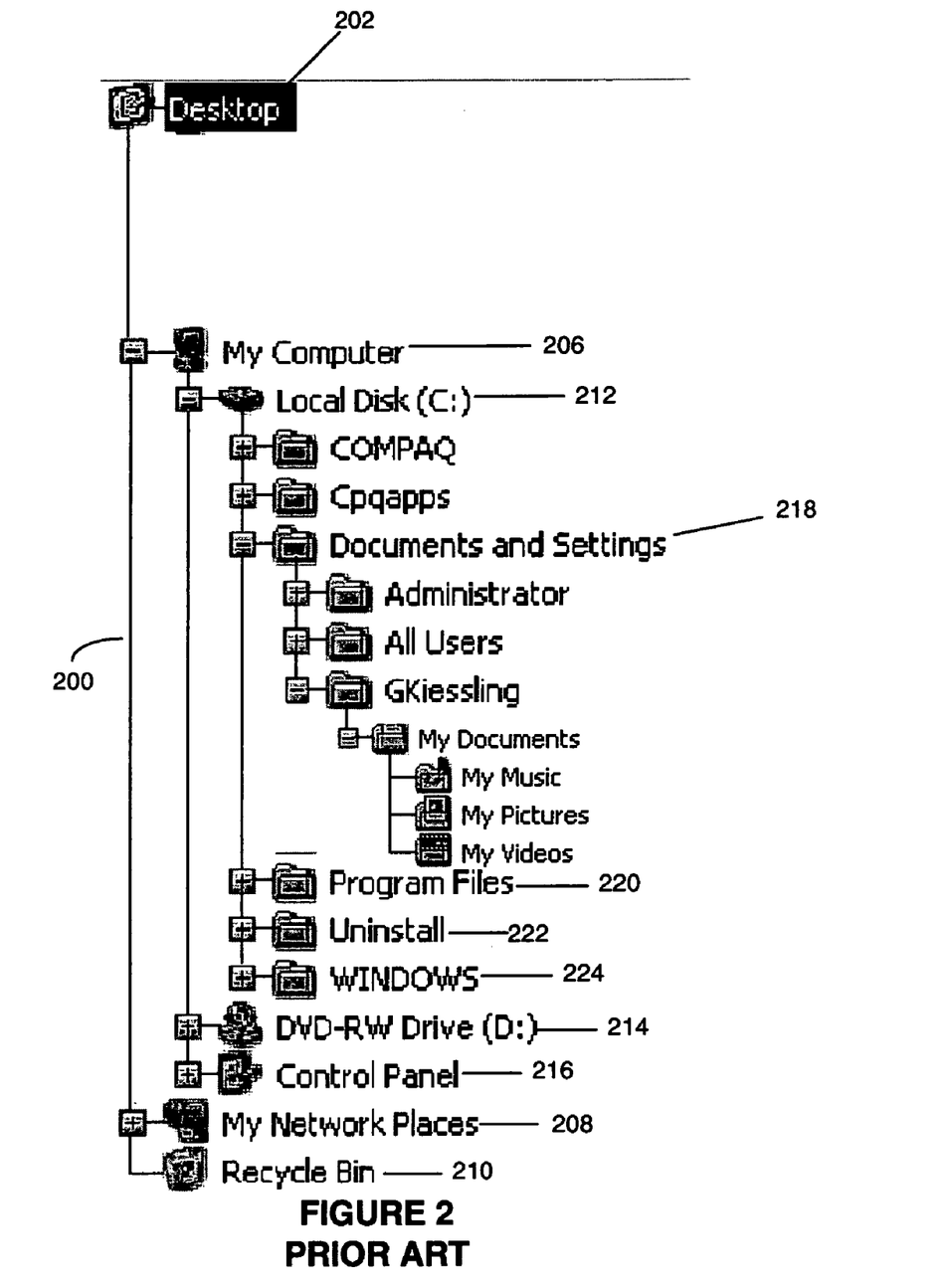
FIG. 2 illustrates an exemplary prior art Shell namespace hierarchy.

One drawback of current namespace configurations involves pollution of the namespace with a mixture of both application data and user data. Layouts of current namespaces do not provide for a clear separation between user data space and application data space. For example, FIG. 2 illustrates a prior art Shell namespace configuration 200 for an operating system such as Microsoft® Windows® XP. Referring to FIG. 2, a number of folders may be displayed wherein each folder belongs to one of four categories which include virtual folders, fixed file-system folders, common folders, and per-user folders.

Virtual folders may be virtual shell folders which appear in the shell namespace and may not have any actual file system folders associated with them. For example, a Printer folder may be a virtual folder. Fixed file folders may be file system folders that are not managed by the Shell and whose location is fixed when the system is installed. For example, the "Windows" folder 224 and the "Program Files" folder 220 may be fixed file folders. The common folders may be file system folders used for sharing data and settings between different users. For example, all users of a machine may share a common desktop folder such as desktop folder 202. Finally, per-user folders may be file system folders which are located under an individual's profile and owned by the individual user. For example, a My Pictures folder may illustrate a per-user folder for storing a user's pictures.

Referring to FIG. 2, the ultimate root of the namespace hierarchy 200 may be Desktop 202. Under the root Desktop 202, numerous other folders may be located such as My Computer folder 206, My Network Places folder 208, and Recycle Bin 210. The My Computer folder 206 may include various folders or mapped drives such as Local Disc (C:) 212, DVD-RW Drive (D:) 214 and Control Panel 216. Those skilled in the art will realize that numerous additional mapped drives and/or folders may be installed and listed in namespace hierarchy 200.

Local Disc (C:) 212 may include various additional folders and files such as Documents and Settings folder 218, Program Files folder 220, Uninstall folder 222, and WINDOWS folder 224. The Program Files folder 220 may contain various application programs that a developer or user may have installed on the particular computing device. The Uninstall folder 222 may provide utilities to assist a user in removing files and/or applications from the computing device. The WINDOWS folder 224 may contain various folder and files for use with a Windows® brand Operating System.

Figure 2A:
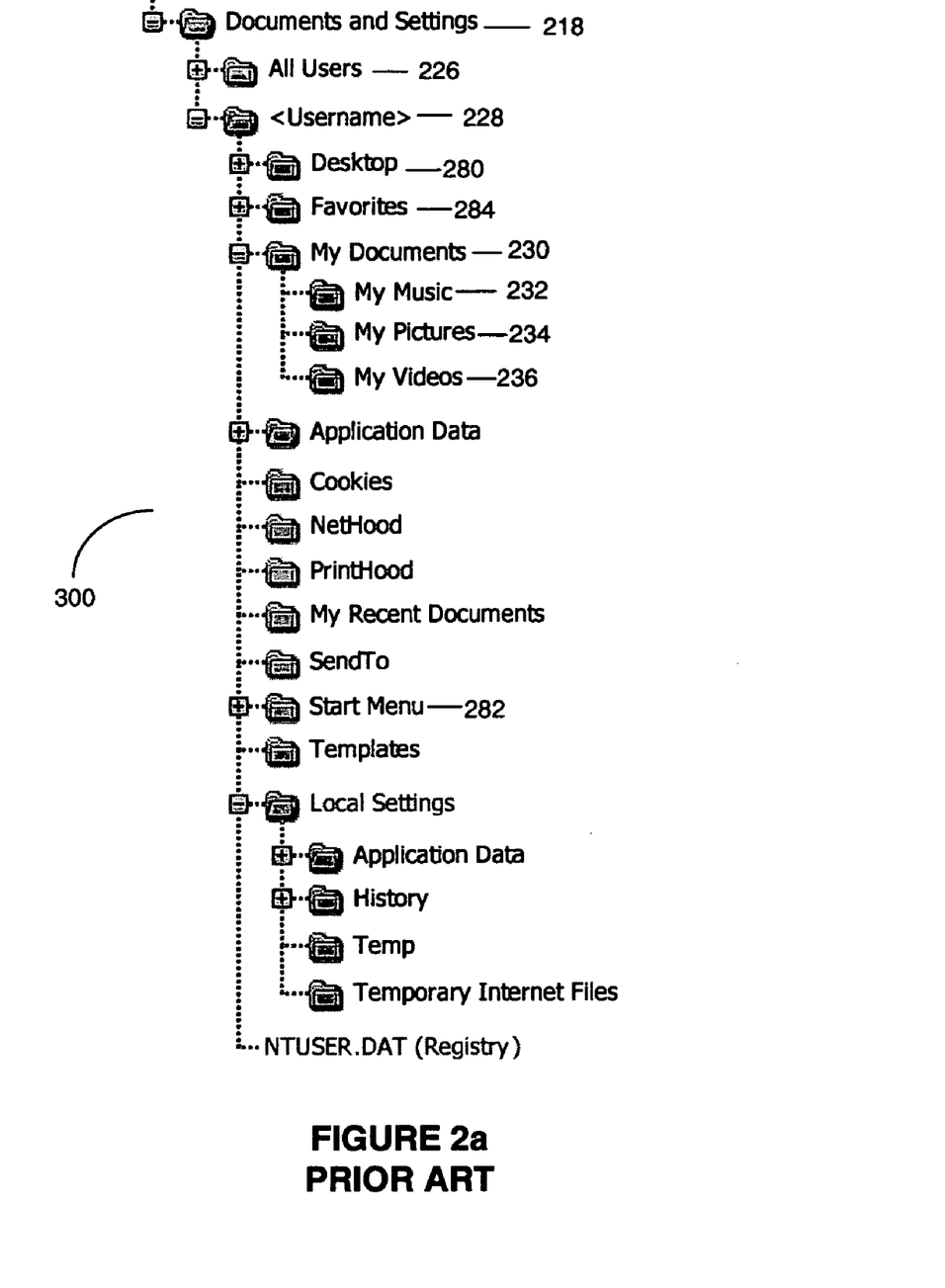
FIG. 2a illustrates an existing user profile namespace hierarchy.

FIG. 2a illustrates a user profile namespace configuration for an operating system such as Microsoft® Windows® XP. Referring to FIG. 2a, an exemplary user profile namespace hierarchy 300 is illustrated. A Documents and Settings Folder 218 may include a number of folders and files such as an All Users folder 226 and multiple user's folders 228. For example, a user such as user George Kiessling may have a user folder identified by the user's name using a format such as "GKiessling." As those skilled in the art will realize, each user may have their own user folder 228 to store particular information for an identified user. For instance, a user folder 228 may contain additional subfolders such as the My Documents folder 230, Desktop folder 280, Start Menu folder 282, Favorites folder 284, and other folders as illustrated in FIG. 2a.

The My Documents folder 230 may be utilized as a default location for all documents created by a user. The My Documents folder 230 may comprise subfolders such as My Music folder 232, My Pictures folder 234, and My Videos folder 236. The My Music folder 232, My Pictures folder 234, and My Videos folder 236 may represent default locations wherein a user may store their music, pictures, and video data files.

A drawback of current namespace hierarchies is that current namespaces hierarchies contain a mixture of both application program data and user data at the root of the namespace hierarchy. In current namespace hierarchies, there is no clean separation between application data and user data. The mixture of both application program data and user data is confusing for users and developers. For example, FIG. 2a illustrates the My Music folder 232, My Pictures folder 234, and the My Videos folder 236 under the My Documents Folder 230 even though these subfolders have little relevance to documents. In addition, a polluted namespace may lead to improper backup of files as users may be confused as to which files routinely should be saved.

Moreover, existing namespace hierarchies give little guidance to developers or application writers as to how applications should store per-user application data inside a user's profile. Further, there is little documentation as to how application developers should structure their folders within an application folder. As a result, application developers create new folders at the root of the namespace hierarchy further congesting the namespace.

Thus, it would be advancement in the art to provide a method and data structure which separates application data from user data in a namespace. The data structure would provide an intuitive profile layout for developers or users while supporting legacy applications. Furthermore, the method and data structure should enable a user to discover and utilize other public or users folders created by various applications which may be located on the same computing system or on a network with a minimal amount of effort.

BRIEF SUMMARY OF THE INVENTION

The inventive method and data structure overcome the problems of the prior art by providing for the separation of application data from user data in a namespace hierarchy. In particular, the data structure provides an intuitive profile layout for developers or users while supporting legacy applications. The namespace allows access by a user over a network to information contained in identified public folders and/or the user's profile folders.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Exemplary Operating Environment

In order to clarify the disclosure of the invention, definitions of several relevant terms are provided herein.

Profile: Provides operating system and applications with a per-user location to store user specific data and settings.

RUP: Roaming User Profile; A profile which roams with a user in an enterprise to provide a similar computing experience on various computing devices.

Known Folder: A special category of folders which are known to the Shell.

Figure 1:
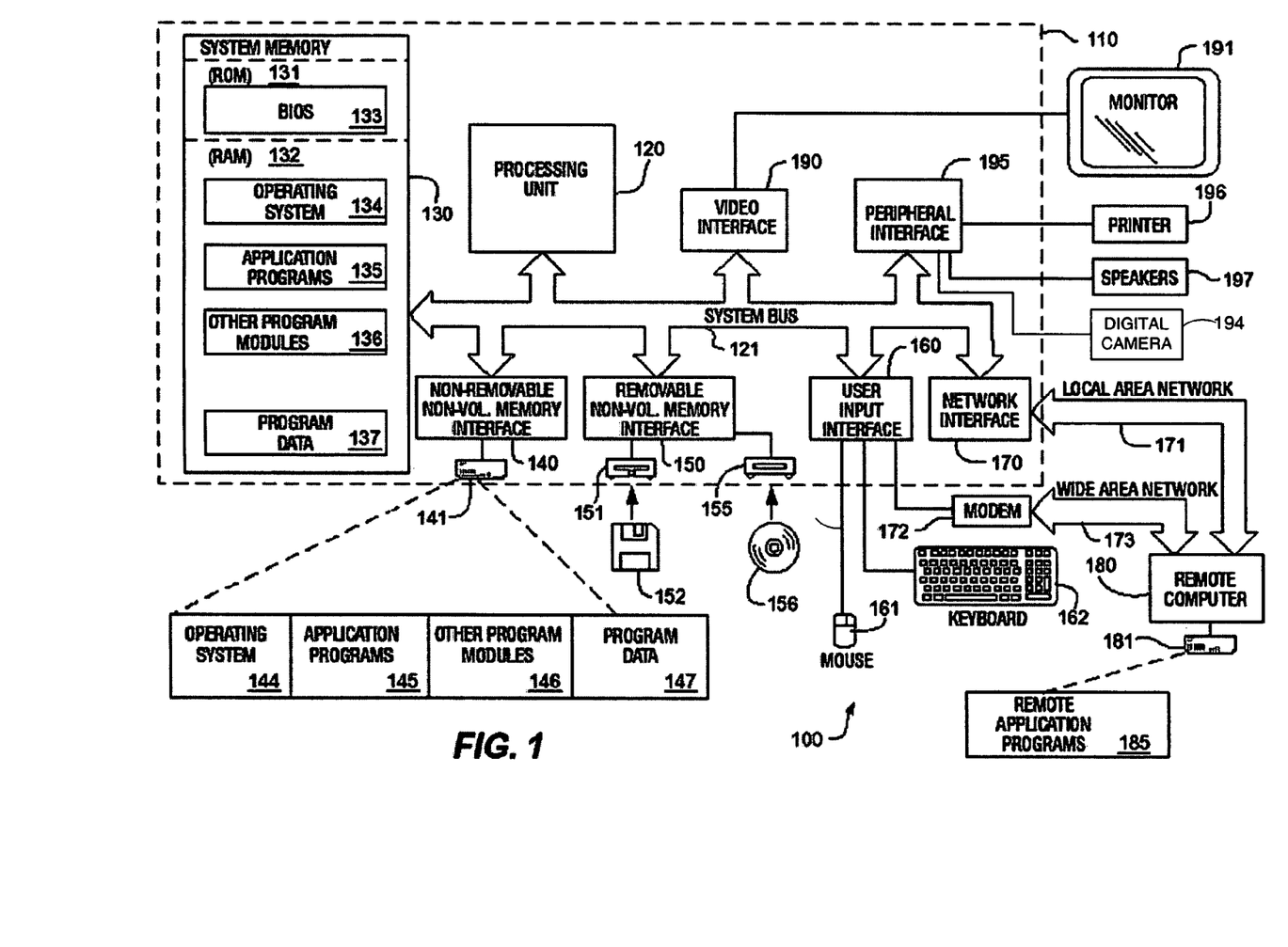
FIG. 1 illustrates an example of a suitable computing system environment on which the invention may be implemented.

FIG. 1 illustrates an example of a suitable computing system environment 100 on which the invention may be implemented. Computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 195.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. A peripheral interface 195 may interface to a video input device such as a scanner (not shown) or a digital camera 194, where output peripheral interface may support a standardized interface, including a universal serial bus (USB) interface.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Description of Illustrative Embodiment

Figure 3:
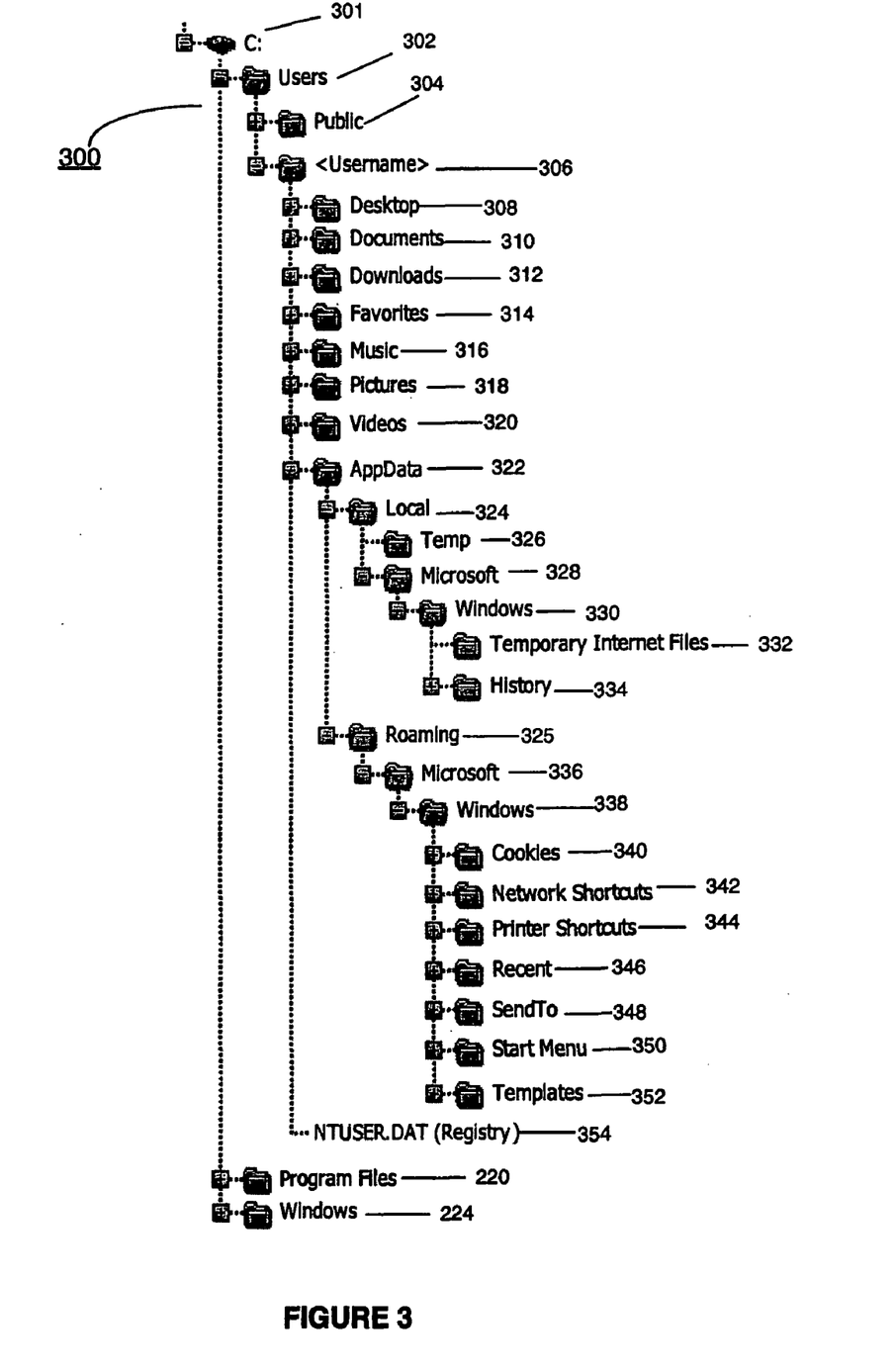
FIG. 3 illustrates a namespace hierarchy in accordance with an aspect of the invention.

FIG. 3 illustrates a namespace in accordance with an aspect of the invention. The namespace 300 as shown in FIG. 3 may include folders and files that may reside on a computer's disk drives such as disc drive C 301. Those skilled in the art will realize that other disc drives may be utilized as the use of disc drive C is exemplary and not intended to be limiting. In addition, those skilled in the art will realize that the names of the folders utilized in the following description may be modified and such modification is within the scope of the described invention. Moreover, the use of specific folder names illustrated in the following description is exemplary and not intended to be limiting.

A Shell may organize these objects into a hierarchical namespace structure through the user interface or through an application. The Shell may contain special folders whose location and existence may be known to the system and access to which is provided from numerous places in the Shell such as the Start Menu.

In an aspect of the invention, namespace 300 may contain numerous other folders such as Program Files 220 and Windows folder 224. A Users folder 302 may be created in an embodiment of the invention directly under disc drive C 301. The Users folder 302 may include numerous users' profiles. For example, a user or developer installing an application will intuitively realize that users' profiles may be installed under Users folder 302.

Users folder 302 may contain a Public folder 304 and a username folder 306. Public folder 304 may include all files and folders a user wishes to share with other users on the local machine or through a network. Public folder 304 may not have a per user registry hive as it is a profile that is never loaded. In addition, a Shell may aggregate certain Public folders such as the Start Menu or Desktop with regular user profiles folders at logon to provide them with one unified view of these folders. For example, an ico added to a desktop folder of a Public profile may be visible to any user that logs into the computer. Public folder 304 may provide users and/or developers with a shared folder that is by default shared with all authenticated users.

A username folder 306 may be provided to each user having an account with a computer system in order to provide each user with an area to store data and customized user settings. The username folder 306 may be utilized as a default folder location for use by open/save dialog boxes of various applications. The Username folder 306 may each contain a similar hierarchy for each user such as illustrated by Desktop folder 308, Documents Folder 310, Downloads folder 312, Favorites folder 314, Music folder 316, Pictures folder 318, Videos folder 320, Application Data (AppData) folder 322, and a hidden file NTUSER.DAT 354. One skilled in the art will realize that numerous additional folders may be created under Username folder 306. Storing data and customized user setting using Username folders in combination with various known folders provides useful and logical storage locations.

The Favorites folder 314, Downloads folder 312, Music folder 316, Pictures Folder 318, and Videos folder 320 may represent default locations wherein a user may store their favorite Internet links, downloads, music, pictures/photos, and video data files, respectively. In one aspect of the invention, the Downloads folder 312, Music folder 316, Pictures Folder 318, and Videos folder 320 are subfolders of username folder 306 and not subfolders of Documents folder 310. A user or developer saving a music file and/or picture, for example, will intuitively realize that a music file may be stored in the Music folder 316 and a picture in the Picture folder 318. The user does not have to try and locate these folders as subfolders of the Documents folder 310 as neither the music file nor the picture may be logically searched for under Documents folder 310.

Desktop folder 308 may be used to store desktop items that include files and shortcuts. Documents folder 310 may provide a default location to store all documents created by a particular user. Downloads folder 312 may provide a default location to save data downloaded from a source such as the Internet. For example, information such as research articles discovered for use by a student on a particular topic may be downloaded and saved for future use in a Downloads folder 312.

Applications data (AppData) folder 322 may provide a developer with a default location to store per-user application data and binaries. The Applications data folder 322 may be a hidden folder that may be utilized by developers when installing new applications or by the application themselves to retrieve per user data or settings. For instance, a less advanced user may not need to access Application data folder 322 and therefore this folder may be hidden until needed by a user. Application data folder 322 may include subfolders such as a Local folder 324 and Roaming folder 325.

Local folder 324 may contain application data and settings that are machine dependent or are too large to effectively roam. In contrast, Roaming folder 325 may contain application data and settings that are not machine dependent such as a user's custom dictionary containing information such as medical definitions. Referring to FIG. 3, Local folder 324 may include a temporary folder 326 and a vendor folder such as a Microsoft vendor folder 328. The Microsoft vendor folder 328 may include numerous subfolders such as Widows folder 330. Similarly, the Windows folder 330 may contain additional folders such as Temporary Internet Files folder 332 and History folder 334. Those skilled in the art will realize that a vendor folder may be utilized to store various applications programs or setting associated with each vendor or manufacturer. For example, a subfolder under the Microsoft vendor folder 328 may be created for each Microsoft application installed on the computing device.

According to an aspect of the invention, a unique identifier for an installed application or product may be required to be presented when creating subfolders in the Application data folder 322. The unique identifier may identify the product being installed and the corresponding manufacturer of the product. For example, the hierarchy may be "Microsoft\Office" which identifies Microsoft as the vendor and Office as the product. Additional information may be included in the unique identifier such as version number, service release, SKU information, minor product name, state category, feature name, component name, and/or deployment identifier. Such additional information may avoid multiple deployment issues of a single product and further identify the applications, and/or features of the product. Exemplary unique identifiers may include "Microsoft\Windows\7.0 SP1 Home Edition", "Microsoft\Office\12.0 Enterprise Edition\Word", and "Microsoft\Windows\7.0 SP1 Home Edition\System\Serviced."

Roaming folder 325 may also include a vendor folder such as Microsoft folder 336. Microsoft folder 336 may include numerous subfolders such as Widows folder 338. Similarly, the Windows folder 338 may contain additional folders such as Cookies folder 340, Network Shortcuts folder 342, Printer Shortcuts folder 344, Recent folder 346, SendTo folder 348, StartMenu folder 350 and Templates folder 352. Each of these folders may include application specific data and settings that are not machine dependent and may be available to the user when logged onto to a different computing device. For example, the Printer Shortcuts folder 344 may include shortcut to access various printers on a network. When a user logs into different computing devices, the Printer Shortcuts folder 344 may still be available to the user enabling the user to easily access different printers located on a network.

Figure 4:
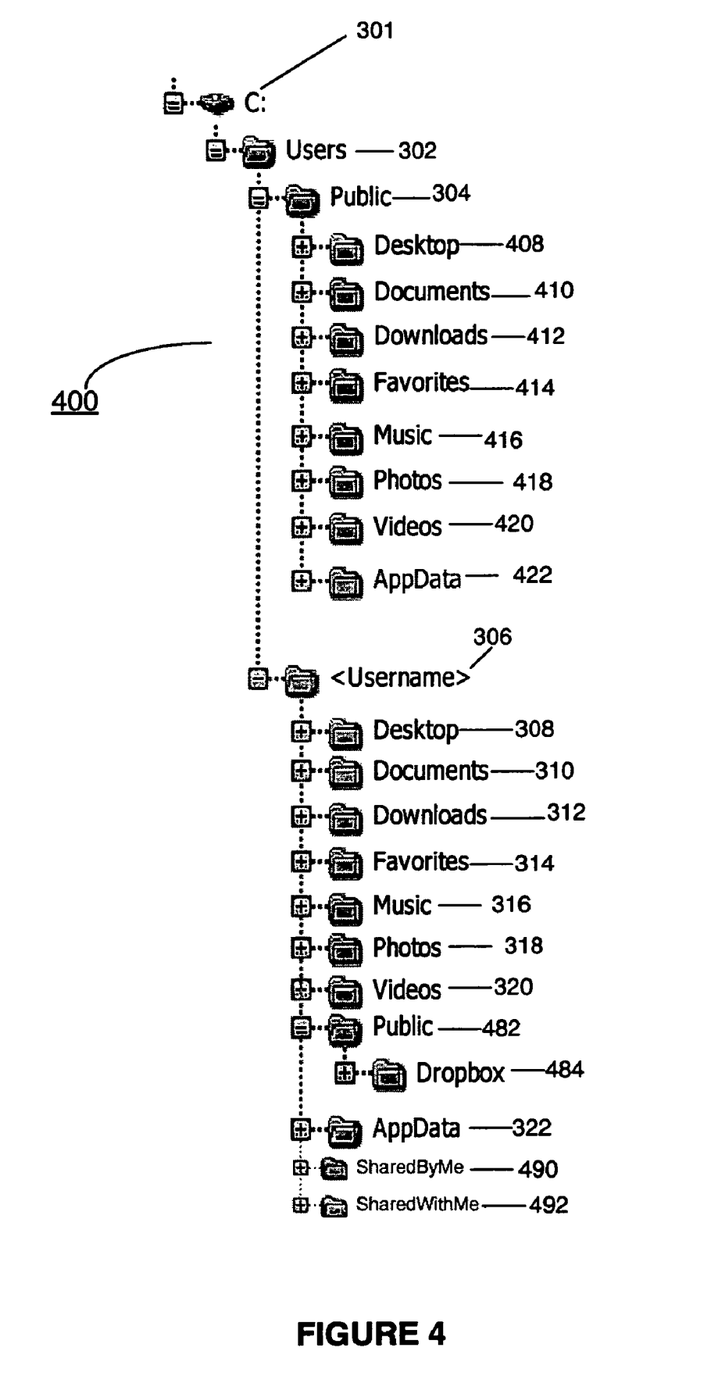
FIG. 4 illustrates another namespace hierarchy in accordance with an aspect of the invention.

FIG. 4 illustrates additional aspects of a namespace hierarchy 400. In FIG. 4, Public folder 304 may include all files and folders that a user or developer desires others to access through the local machine or networked devices. Public folder 304 may include a similar hierarchy as that discussed above for username folders 306. For instance, Public folder 304 may include a Desktop folder 408, Documents Folder 410, Downloads folder 412, Favorites folder 414, Music folder 416, Pictures folder 418, Videos folder 420, and Application Data (AppData) folder 422. Application Data folder 422 may be a hidden folder.

The Favorites folder 414, Downloads folder 412, Music folder 416, Pictures Folder 418, and Videos folder 420 may represent default locations wherein a user may store and share with other users their favorite Internet links, downloads, music, pictures/photos, and video data files, respectively. Desktop folder 408 may be used to store desktop items that include files and shortcuts. These stored desktop files and shortcuts are available to any authenticated user as they are accessible as subfolders of Public folder 304. Similarly, documents stored in the Documents folder 410 or information downloaded into the Downloads folder 412 may be accessible to other authenticated users.

In another aspect of the invention, a Public folder 482 may also be included in the username folder 306. Public folder 482 may provide a user with the capability of sharing information with other users from within their own profile. Moreover, a user may have the capability to define and individually control other users rights to data contained in such a Public folder 482. For example, a developer may grant read only access to certain users, whereas, other users may have execute access. Public folder 482 may also include subfolders such as Dropbox folder 484. Dropbox folder 484 may provide a user with the capability of receiving files from other authenticated users specifically for them in Dropbox folder 484. In an embodiment of the invention, Dropbox folder 484 may be provided with write only access to prevent unauthorized remote users from viewing files placed in Dropbox folder 484. To further enable sharing within the namespace, hidden folders such as a SharedByMe folder 490 and a SharedWithMe folder 492 may be created under username folder 306. The SharedByMe folder 490 may include synchronized copies of data shared by the user with other users. The SharedWithMe folder 492 may include synchronized copies of data shared with the user to other users.

In another aspect of the invention, legacy application compatibility for applications relying on an older profile namespace hierarchy as shown in FIG. 3 may be provided through the use of a file system filter driver. A filter driver may intercept all open calls for a path to the file system and determine if it matches an older legacy path. If it does it may repoint the application to the new valid path for that legacy path. The filter driver may also include an updatable mapping table providing the filter driver with a list of remapped legacy paths.

In an alternative aspect of the invention, a directory junction may also be utilized to provide legacy application compatibility similar to the filter driver. Directory junction is different from a hard link in that the storage objects it references are separate directories. Directory junction may be created at legacy namespace locations to point to new namespace locations. When an application attempts to access a legacy profile location, the directory junction redirects the application to the new valid namespace location.

In another aspect of the invention, the namespace hierarchy may allow for easier querying of data as queries may be created that partition the set of data used. For example, a query may be comprised of a predicate ("what"—such as "author is John Smith") and a scope ("where" such as C:\users\jsmith\documents\). The namespace hierarchy allows users to make queries that partition the set of data used.

Figure 5:
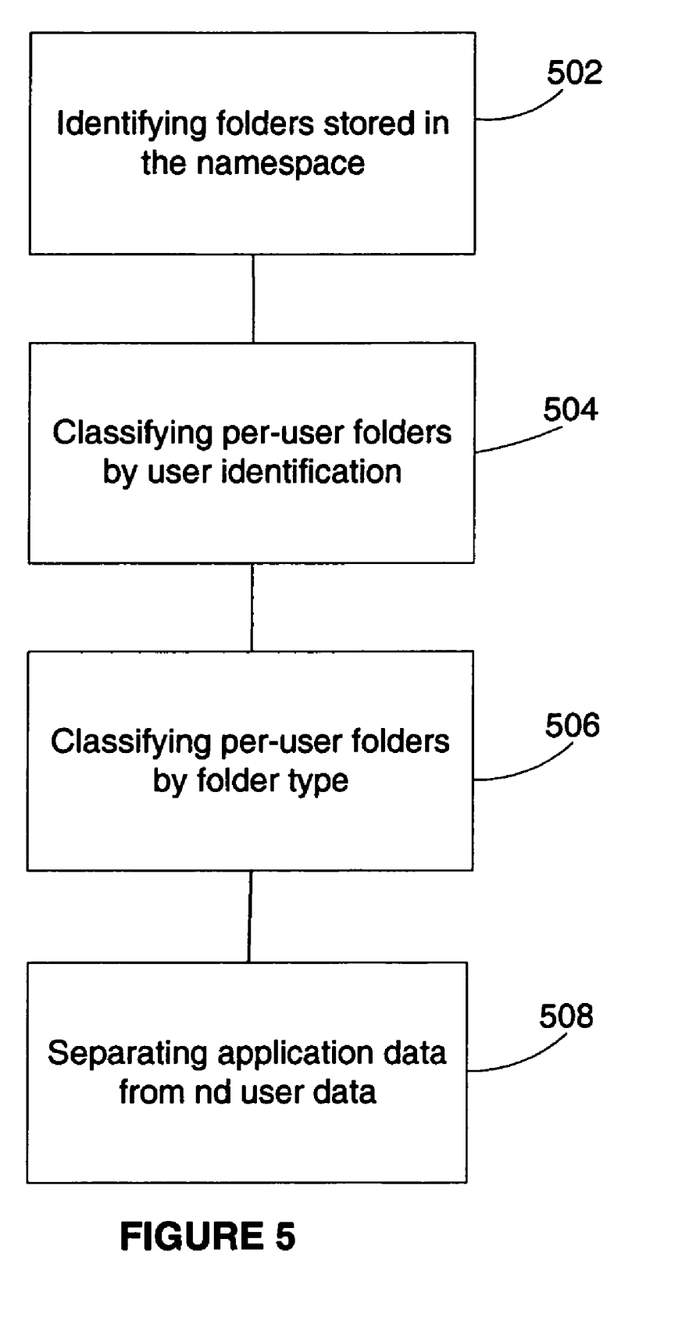
FIG. 5 illustrates a method of managing application data from user data in a namespace hierarchy in accordance with an aspect of the invention.

In accordance with another aspect of the invention, FIG. 5 illustrates a method of managing application data and user data stored in a plurality of folders in a namespace data structure. In FIG. 5, at step 502 each folder of a plurality of folders is identified as being a public folder or a per-user folder. A public folder may define a folder that is being shared with all users of a computing system such as a Desktop folder. A per-user folder may be a system folder which is located in a user's profile and owned by the individual user. For example, a Music folder may illustrate a per-user folder for storing a particular user's music.

After identifying a folder's accessibility, each per-user folder may be classified by user identification as shown in step 504. As discussed above, each authenticated user of a computing system may have their own user profile on the system in which to store their own data and/or user settings. Each user profile may be identified through use of a combination of alphanumeric characters from a user's first and last name. Those skilled in the art will realize that numerous combinations of characters may be utilized to identify a user's profile. In step 506, the identified per-user folders are further classified by folder type. Finally, in step 508 the application data and user data are separated based on the classifications. The separation of application data from user data provides an intuitive profile layout for developers or users while supporting legacy applications.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A computer-readable storage medium having stored thereon computer-executable instructions that, when executed, performs a method of separating data stored in a namespace, the method comprising:

creating a users folder configured to store profiles for a plurality of users;

creating a public folder for storing information to be shared with other users, the public folder being a subfolder one namespace-hierarchy level beneath the users folder;

creating at least one user folder for separating application data from user data in the namespace, the at least one user folder being a subfolder one namespace-hierarchy level beneath the users folder, the at least one user folder further comprising the following subfolders one namespace-hierarchy level beneath the at least one user folder:

i) a desktop folder, a desktop including shortcuts;

ii) a documents folder for storing documents created by a user;

iii) a downloads folder for storing content downloaded by the user;

iv) a favorites folder for storing website addresses saved by the user;

v) a music folder for storing music files saved by the user;

vi) a video folder for storing video files saved by the user;

vii) a pictures folder for storing pictures saved by the user; and vii) an application data folder for storing user application data and binaries, wherein the application data folder comprises a local folder and a roaming- folder, wherein the local folder stores machine-dependent application data and settings, and the roaming folder stores machine-independent application data and settings; and separating the application data from user data in the namespace in the at least one user folder, wherein the public folder includes subfolders to further separate application data from user data in a namespace, the subfolders comprising:

i) a second desktop folder, the second desktop including shortcuts;

ii) a second documents folder, the second documents folder for storing documents created by the user;

iii) a second download folder for storing content downloaded by the user;

iv) a second music folder for storing music files;

v) a second pictures folder for storing pictures;

vi) a second video folder for storing videos;

vii) a second favorites folder for storing website addresses saved by the user; and viii) a second application data folder for storing shared application data and binaries.

2. The computer-readable storage medium of claim 1, wherein the documents folder comprises a default storage location for storing documents created by the user.

3. The computer-readable storage medium of claim 1, wherein the local folder further comprises default folders for storage of machine specific data and setting, the default folders comprising a temporary folder, and application specific folders.

4. The computer-readable storage medium of claim 1, wherein the roaming folder further comprises default folders for storage of machine-specific data and settings, wherein the default folders comprise application-specific folders.

5. The computer-readable storage medium of claim 1, wherein the application data folder is a hidden folder.

6. The computer-readable storage medium of claim 5, wherein the at least one user folder further comprises a SharedByMe folder and a SharedWithMe folder, the SharedByMe folder including synchronized copies of data shared by the user with other users, the SharedByMe folder including synchronized copies of data shared with the user by the other users.

7. The computer-readable storage medium of claim 1, wherein a user is granted default access to each of the sub-folders, the default access including read and execute access based on security groups to which the user belongs.

8. A method of separating application data and user data stored in a plurality of folders in a namespace data structure, the method comprising:
creating in a computing device, at a first namespace-hierarchy level that is one namespace-hierarchy level below a users folder configured to store user profiles for a plurality of users, a public folder for storing information to be shared with other users;
creating, at the first namespace-hierarchy level, per-user folders for each user, the per-user folders storing data and settings particular to each user;
creating, at a second namespace-hierarchy level that is one level below the first namespace-hierarchy level, subfolders for each per-user folder that separate application data and user data, the sub-folders including:
i) a desktop folder, the desktop including shortcuts;
ii) a documents folder for storing documents created by the user;
iii) a downloads folder for storing content downloaded by the user;
iv) a favorites folder for storing website addresses saved by the user;
v) a music folder for storing music files saved by the user;
vi) a video folder for storing video files saved by the user;
vii) a pictures folder for storing pictures saved by the user; and
viii) an application data folder for storing per-user application data and binaries, wherein the application data folder includes a local folder and a roaming folder, wherein further the local folder stores machine-dependent application data and settings, and the roaming folder stores machine-independent application data and settings; and
separating the application data and user data in the each per-user folder,
wherein the public folder includes subfolders to further separate application data from user data in a namespace, the subfolders comprising:
i) a second desktop folder, the second desktop including shortcuts;
ii) a second documents folder, the second documents folder for storing documents created by the user;
iii) a second download folder for storing content downloaded by the user;
iv) a second music folder for storing music files;
v) a second pictures folder for storing pictures;
vi) a second video folder for storing videos;
vii) a second favorites folder for storing website addresses saved by the User;
viii) a second application data folder for storing shared application data and binaries; and
wherein the user controls access to each of the subfolders.

9. The method of separating application data and user data of claim 8, wherein the documents folder comprises a default storage location for storing documents created by the user.

10. The method of separating application data and user data of claim 8, wherein the local folder further comprises default folders for storage of machine specific data and setting, the default folders comprising a temporary folder, and application specific folders.

11. The method of separating application data and user data of claim 8, wherein the roaming folder further comprises default folders for storage of machine-specific data and settings, and the default folders further comprise application-specific folders.

* * * * *